April 7, 1942. K. P. BRACE Re. 22,058

AIR CONDITIONING UNIT

Original Filed Oct. 24, 1932 3 Sheets-Sheet 1

INVENTOR-
Kenton Pum Brace
BY Virgil F. Davies
ATTORNEY-

April 7, 1942. K. P. BRACE Re. 22,058

AIR CONDITIONING UNIT

Original Filed Oct. 24, 1932 3 Sheets-Sheet 2

INVENTOR-
Kemper Penn Brace
BY Virgil F. Davis
ATTORNEY-

April 7, 1942. K. P. BRACE Re. 22,058

AIR CONDITIONING UNIT

Original Filed Oct. 24, 1932 3 Sheets-Sheet 3

INVENTOR-
Kemper Penn Brace
BY
Virgil F. Davies
ATTORNEY-

Reissued Apr. 7, 1942

Re. 22,058

UNITED STATES PATENT OFFICE 22,058

AIR CONDITIONING UNIT

Kemper Penn Brace, South Bend, Ind., assignor, by mesne assignments, to Allin B. Crouch, Schenectady, N. Y., as trustee Original No. 2,058,405, dated October 27, 1936, Serial No. 639,186, October 24, 1932. Application for reissue October 26, 1938, Serial No. 237,087

11 Claims. (Cl. 62—140)

This invention relates in general to air conditioning and in particular to the conditioning, during the summer season, of enclosures of limited size such as rooms of dwellings, office rooms, small halls and the like.

Air conditioning systems for buildings which house a plurality of separate enclosures such as office rooms, dwelling rooms and the like have been proposed. These systems usually include a central air conditioning unit from which conditioned air is led to the separate rooms by means of suitable duct work. By reason of the duct work required, these systems are practically limited to new buildings designed to accommodate them as the necessary remodelling of existing buildings is excessive and its cost prohibitive, also, after these systems are installed they cannot be readily modified as may be required by changed use of some or all of the rooms. Furthermore, control of conditions at the individual rooms with these systems is extremely limited and the whole building is maintained at substantially the same conditions.

Because of these and other drawbacks of the systems just referred to, it has been proposed to provide individual air conditioning units for each room, thereby making it possible to condition each room as desired by the occupants thereof. The units proposed either employ a water spray as the cooling and dehumidification medium or produce the cooling and dehumidification result by contacting the conditioning air with the surface of coils thru which is passed a refrigerant or a cooled heat exchange medium. In some of the units the water, or refrigerant, or heat exchange medium, as the case may be, is cooled by means of refrigeration apparatus included in the unit; in the other of the units the water, or refrigerant, or heat exchange medium is cooled at centrally located refrigeration apparatus which supplies all of the units in the building. For this reason it is necessary to employ piping in the installation of the last mentioned type of unit.

Since it is almost invariably necessary to dehumidify as well as to cool conditioning air during the summer season it is necessary to provide piping for the disposal of the water condensed with both types of units. The necessity of the piping both increases the cost of the units and reduces the flexibility of the system employing them.

All of the units that I am aware of sufficiently practical to be in use in actual installations are so arranged that the refrigeration apparatus, whether located in the unit or at a remote place, operates only during the time the enclosure is actually being conditioned. Because of such arrangement these units are subject to some very serious objections. For instance, in the case of the units which contain the refrigeration apparatus as a part thereof the noises emitted by the refrigeration apparatus are enough to prohibit their use in rooms such as offices, conference rooms, and the like, where a minimum of distracting noises is permitted. This same type of unit is subject to the further objection that it must include some means for removing from the refrigeration apparatus at least as much heat as the unit removes from the conditioning air. Such means of course increases the initial as well as the operating cost of the unit. If the means just mentioned for any reason does not function properly not only will the load in the refrigeration apparatus be increased but the conditioning of the enclosure will not take place as desired.

Both types of units because of the arrangement of the refrigeration apparatus mentioned above are subject to the objection self evident from the following:

Assuming that the enclosures are to be conditioned for eight hours per day which is a reasonable maximum for the type enclosures heretofore mentioned, that at maximum summer weather for the locality in which the units are installed the out door air has a dry bulb of 95° F., a wet bulb of 76° F. and a dew point of 69° F., and that the enclosure during such maximum weather is to be maintained at a dry bulb of 80° F., a wet bulb of 66° F., and a dew point of 60° F. A study of the weather records for a large number of localities shows that for any locality if the maximum dry bulb temperature during the day is 95° F. the hourly temperature readings for the rest of the day are approximately as follows:

| Time | Outside dry-bulb temperature | Difference between outside and assumed desired inside temperature (80° F.) |
|---|---|---|
| 9–10 a. m. | 83° F. | 3° F. |
| 10–11 a. m. | 86° F. | 6° F. |
| 11–12 a. m. | 90° F. | 10° F. |
| 12–1 p. m. | 93° F. | 13° F. |
| 1–2 p. m. | 95° F. | 15° F. |
| 2–3 p. m. | 95° F. | 15° F. |
| 3–4 p. m. | 93° F. | 13° F. |
| 4–5 p. m. | 90° F. | 10° F. |
| Average | 90.6° F. | 10.6° F. |

From the above it is evident that the refrigeration apparatus associated with either type of unit above mentioned must be of sufficient capacity to handle the maximum temperature difference, in the example assumed 15° F., even though it operates at maximum capacity for only a quarter of the conditioning time and for the remaining three-quarters operates at a load which may be as low as one-fifth of the maximum. Since refrigeration apparatus are generally designed for maximum efficiency at the rated load it is evident that the refrigeration apparatus of these units operate at their best efficiency for only one quarter of the time. Thus the operating cost of these units is necessarily excessive when it is considered that it is possible, as I will explain hereinafter in the disclosure of my invention, to accumulate by means of a suitable medium the effect of the refrigeration apparatus. The excessive capacity and consequently the excessive initial cost of the refrigeration apparatus of the units mentioned is obvious. Thus by accumulating the refrigeration effect and operating the refrigeration apparatus at rated load for the full eight hour period refrigeration apparatus capable of maintaining a 10.6° F. difference between the outside and the conditioned space would be sufficient in the example assumed. However, there is no reason why the operation of the refrigeration apparatus should be confined to the eight hour conditioning period; in installations where noise is not objected to the refrigeration apparatus can be operated for twenty-four hours; in installations where noise is objected to the refrigeration apparatus can be operated for the sixteen hours that the enclosure is not being occupied. Hence it is obvious that the refrigeration apparatus of the present units are from 1.4 times to 4.35 times the capacity required. Since the refrigeration apparatus cost is the major proportion of the cost of the units, the excessive cost of the present day units is obvious.

In accordance with my invention I provide a portable self-contained air conditioning unit. That is to say, a unit which contains within itself all the elements necessary for cooling and conditioning the enclosure in which it is located, for disposing of the water condensed during dehumidification of the air in the enclosure, and for dissipation of the heat generated by the refrigeration apparatus, which unit requires only a connection to the ordinary current line, as distinguished from a power line, and can be completely installed and put in operation without the need of any piping or duct work whatsoever. The refrigeration apparatus housed in the unit is of such capacity that during the allowed operating time, i. e., twenty-four hours per day where the noise of the refrigeration apparatus is not objected to and twenty-four hours per day minus the time of occupation of the enclosure where the noise is objected to, it is able to do the quantum of work necessary to condition the enclosure during a day of maximum weather.

In the unit is stored in heat exchange relation with the coil of the refrigeration apparatus a quantity of heat exchange medium capable of storing the refrigeration effect necessary to condition the enclosure during said day of maximum weather. The conditioning air is passed in heat exchange relation with said medium and by controlling the conditioning air flow through the unit as by thermostatically controlled means, the refrigeration effect is used as required to maintain the desired conditions in the enclosure. By means of automatic control means associated with the refrigeration apparatus and the heat exchange medium the refrigeration apparatus is automatically shut down whenever the heat exchange medium has stored therein the refrigeration effect necessary to condition the enclosure during said day of maximum weather. By this arrangement the refrigeration apparatus operates only as required to maintain the stored refrigeration effect at the maximum at the beginning of each occupation period of the enclosure.

Various heat exchange mediums may be used, such mediums may be liquids, gases, solids or solutions. However, in order to maintain the quantity of heat exchange medium to a minimum, and thus keep down the size of the unit, I prefer to use a medium which undergoes a change of phase and/or state at a reduced temperature. Because of its low cost and availability and of its comparatively high storing capacity I have found that water fills all the requirements of an ideal heat exchange medium for my purpose.

In order to dissipate the heat abstracted from the heat exchange medium and generated by the various motors used, conduit means are provided for leading air from the outside into heat exchange relation with the compressor and condenser of the refrigeration apparatus and the various motors used and from thence back to the outside. In order to avoid the necessity of connecting conduits, the inlet and outlet of said conduit means are arranged to fit into the bottom of the window opening adjacent to which the units are generally located. Such inlet and outlet may be attached to an adjustable barrier so that the heat abstracted may be prevented from getting into the enclosure simply by bringing the bottom of the window into contact with the barrier. The water condensed during the dehumidification of the conditioning air is disposed of by spraying it into contact with the condenser of the refrigerator. This results in complete evaporation of the condensed moisture thereby eliminating the necessity of any drain connection, and also increases the efficiency of the refrigeration apparatus by causing the liquid refrigerant to be condensed at a lower temperature and pressure.

Other objects and advantages of my invention will be readily apparent from a consideration of the preferred embodiments thereof illustrated in the accompanying drawings, in which—

Fig. 5 is a view, similar to Fig. 2, of another preferred embodiment.

Figure 1:
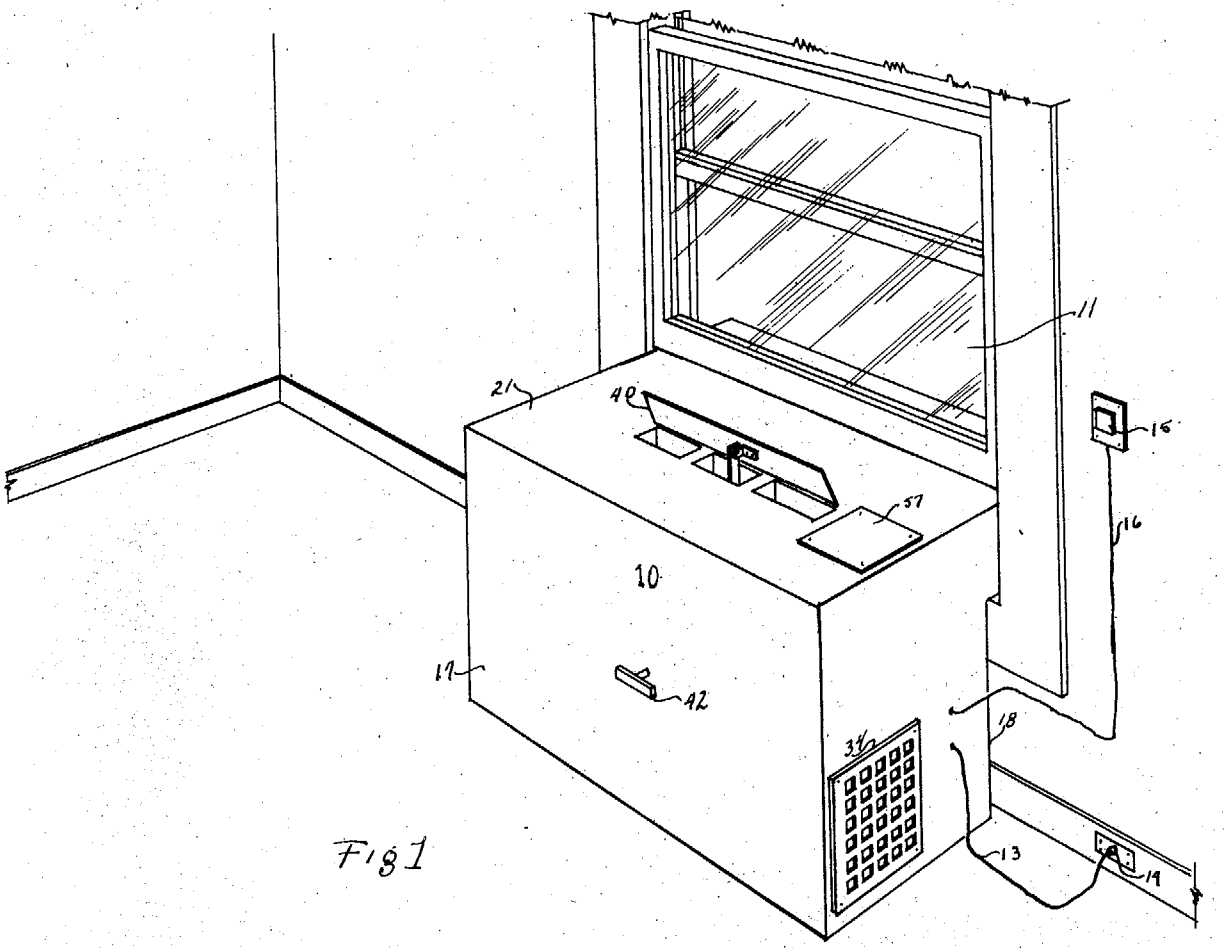
Fig. 1 is a perspective view of the conditioning unit as installed in an enclosure.
Figure 3:
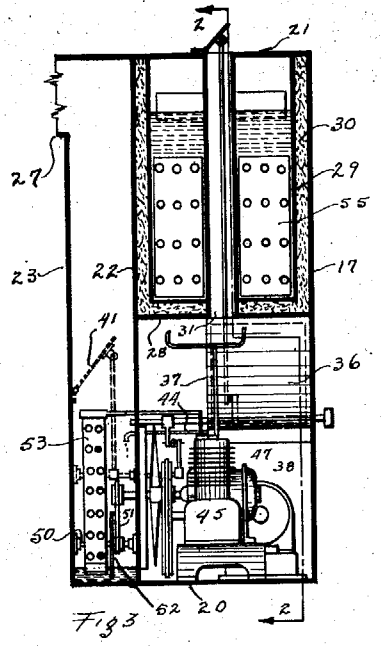
Fig. 3 is a part sectional end view taken on line 3—3 of Fig. 2.
Figure 2:
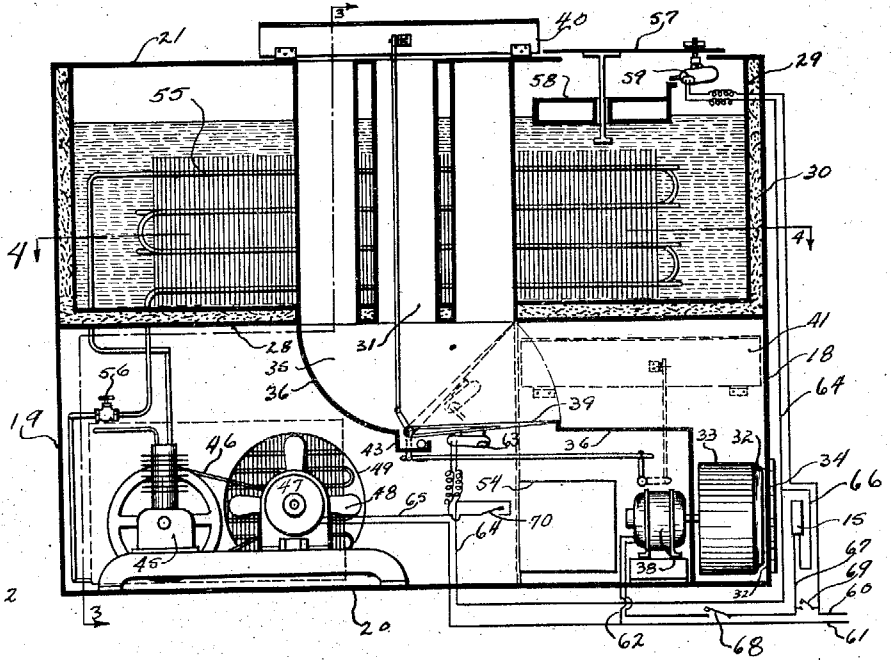
Fig. 2 is a part sectional view taken on line 2—2 of Fig. 3.
Figure 4:
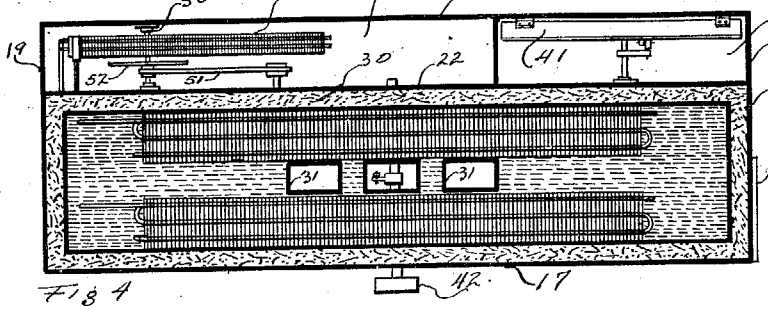
Fig. 4 is a part sectional plan view taken on line 4—4 of Fig. 2.
Figure 6:
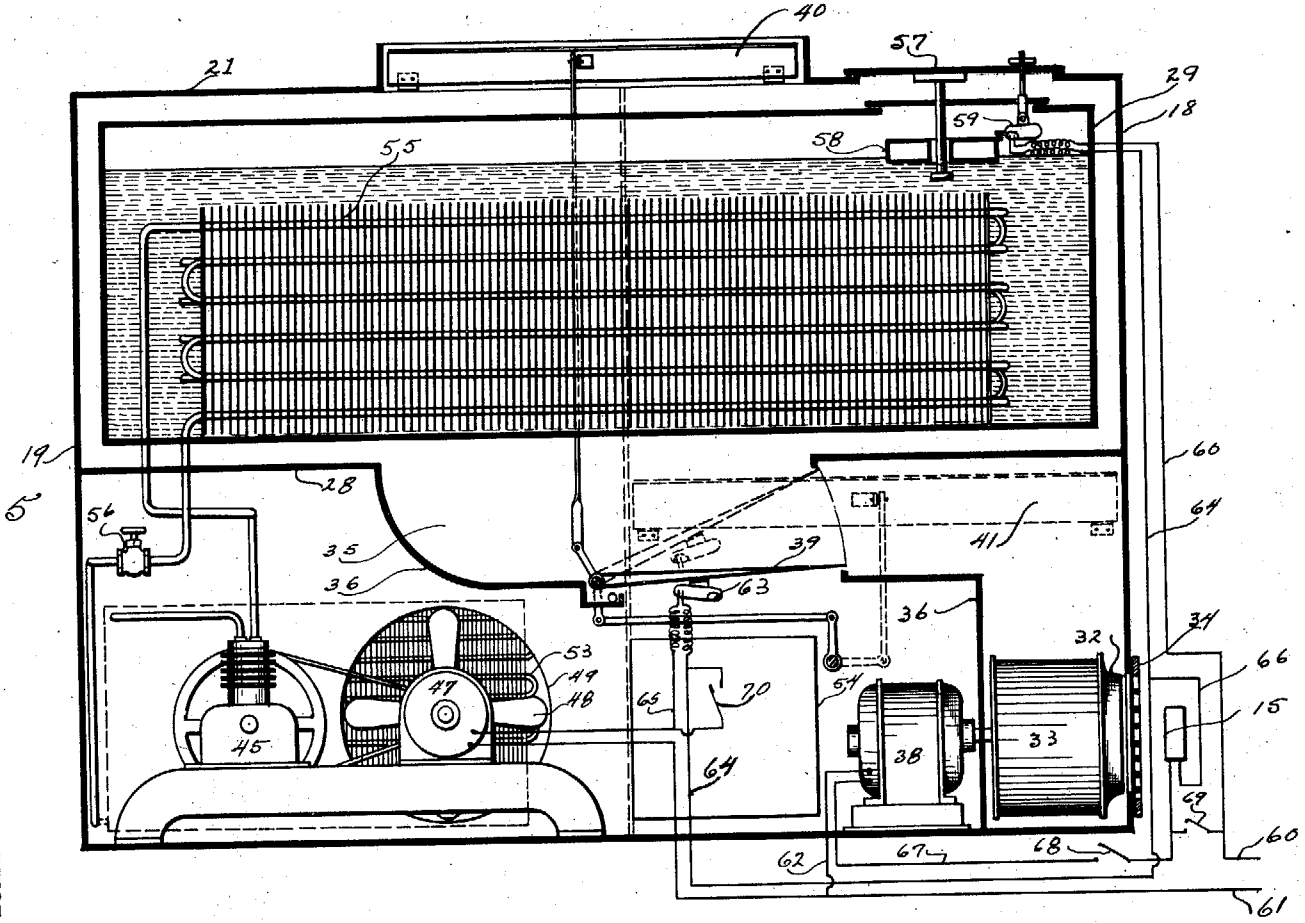

The unit 10, as shown, may be conveniently located below a window 11 of the enclosure 12 to be conditioned, the motor elements of unit 10 later to be described, being connected to the ordinary house current line by means of a cable 13 and a plug 14 and a settable motor control thermostat 15 being connected by a cable 16, which includes conductors hereinafter described, to certain of the motor elements of unit 10.

Unit 10 includes a suitable frame, not shown, to which are fastened front wall 17, side walls 18 and 19, bottom wall 20, top wall 21, and vertical partition 22. Preferably, wall 19 is arranged to be readily removed to allow access to the parts of unit 10 described hereinafter. To side walls 18 and 19 is fastened rear wall 23; the space between partition 22 and rear wall 23 being divided by vertical partition 24 to form two air ducts 25 and 26. At the top of unit 10 side walls 18 and 19, partition 24 and top wall 21 are extended to cooperate with plate 27 to form extensions of ducts 25 and 26. These extensions, as shown in Fig. 1, serve to communicate ducts 25 and 26 to the atmosphere, and when the window 11 is closed on them serve to prevent flow of air from the room into ducts 25 and 26 and vice versa.

The space of unit 10 between partitions 22 and front wall 17 is divided into an upper and a lower compartment by partition 28. In the upper compartment is suitably supported from the frame, not shown, of unit 10 a metal tank 29 which is insulated on its sides and bottom by insulation 30. One or more rows of metallic conduits 31 extend through tank 29 and have their ends welded or otherwise made integral with the top and bottom of tank 29. Top and bottom insulation 30 as well as partition 28 and top wall 21 are perforated to allow passage of air from the lower compartment through conduits 31 to enclosure 12.

Near the bottom of side wall 18 is an opening 32 through which motor operated fan 33 draws air from enclosure 12. Opening 32 is protected by grille 34 and fan 33 is housed in the bottom of a conduit 35 which leads air from opening 32 to the bottom of conduits 31. Conduit 35 is defined by the members 36 and 37 and portions of front wall 16, side wall 18 and partition 28. Motor 38 of fan 33 is located in the space between member 36 and side wall 19.

Member 36 has a hole cut therein to allow communication between duct 35 and the lower compartment of unit 10. This hole is controlled by a damper 39 which in its full line position closes communication between duct 35 and the lower compartment of unit 10 and in its dotted line position closes the passage of air to ducts 31. A damper 40 is hinged to top wall 21 and in its closed position closes the outlets of conduits 31. A damper 41 hinged to rear wall 23, is positioned in duct 25. This damper in its closed position prevents passage of air through duct 25. Dampers 39, 40 and 41 are conencted by a link mechanism to be movable in unison by movement of knob 42, the arrangement being such that when damper 39 is in the full line position dampers 40 and 41 are in the open position and when damper 39 is in the dotted line position dampers 40 and 41 are in the closed position.

The edge of member 36 adjacent to the edge of damper 39 nearest side wall 18 is bent to form a channel 43. Channel 43 is adapted to collect the water condensed on the surface of conduits 31 and lead it through pipe 44 to conduit 26.

A compressor 45 which is driven by belt 46 from motor 47 is in the bottom compartment of unit 10. The shaft of motor 47 has fan blades 48 attached thereto which serve to pass air from the bottom compartment of unit 10 through circular hole 49 cut in partition 22 into duct 26. A shaft 50 has its ends journalled in partition 22 and rear wall 23 and is driven by belt 51 from the shaft of motor 47. Shaft 50 has a thin disc 52 pinned thereto. Disc 52 is of such size as to approach the bottom of duct 26 and thus as it rotates will pick up any water therein and spray it upwardly against condenser 53 which is also located in duct 26. If desired, a pump may be used in place of disc 52 and the water dripped over condenser 53 through a suitable pipe (not shown). A hole 54 is cut in partition 22 and offers communication between duct 25 and the bottom compartment of unit 10. The inlet of compressor 45 is connected to a finned coil 55 located in tank 29, the outlet of compressor 45 being connected to the inlet of condenser 53, the outlet of which is connected to expansion valve 56. Expansion valve 56 is also connected to the inlet of coil 55.

A plate 57, removably fastened to top wall 21 by means not shown, overlies a hole in the top of tank 29. From the bottom of plate 57 depend two members, one of which supports a float 58 for free vertical movement, and the other of which is vertically adjustable and supports a mercury switch 59 for oscillation relative thereto. Float 58 may have a projecting edge or a pin fastened to it which is adapted to cooperate with the projection on switch 59 to open the circuit controlled by switch 59 when the water in tank 29 has expanded the predetermined amount. By adjusting the support of switch 59 the switch may operate when all the water or any proportion of it is frozen.

Cable 13, which for convenience will be considered as including two conductors 60 and 61, supplies the current for motors 38 and 47. Conductor 61 connects directly to one terminal of motor 47 and through conductor 62 connects to one terminal of motor 38. Conductor 60 is connected to one terminal of mercury switch 59 the other terminal of which is connected to one of the terminals of mercury switch 63 by conductor 64. A conductor 65 connects the other terminal of mercury switch 63 to the other terminal of motor 47. A conductor 66 connects to conductor 64 and one terminal of settable motor control thermostat 15, the other terminal of which is connected through conductor 67 to the other terminal of motor 38. A switch 68 interrupts conductor 67 and a switch 69 makes it possible to connect conductors 60 and 67 so that when desired motor 38 may be manually controlled. Switches 68 and 69 are positioned to be accessible from the outside of unit 10. A switch 70 is also provided by means of which conductors 64 and 65 may be connected thus making it possible to cut out mercury switch 63 when desired. When switch 63 is in the circuit of motor 47, it is impossible for motor 47 to operate when damper 39 is in the full line position.

Unit 10 is installed in enclosure 12 by placing it as shown in Fig. 1, and connecting cable 13 to the house current line. Thermostat 15 is then set to the temperature at which it is desired to maintain enclosure 12 and cable 13 connected to it. The size of tank 29 is such as to hold the volume of ice necessary to maintain enclosure 12 at the predetermined conditions during the period of occupation of maximum outside weather. The water required to form such ice is placed in tank 29 through the opening closed by plate 57. The support of switch 59 is adjusted so that float 58 will operate switch 59 when the predetermined expansion of the water in tank 29 has taken place. Compressor 45, condenser 53, and coil 56 are of such size and capacity that said ice will be produced with compressor 45 operating at its rated load during a selected period of operation. The selected period, as heretofore stated, may be twenty-four hours or less.

Assuming now that we are at the beginning of what may be called the charging period, that is, the period during which compressor 45 operates, and that the charging period is 24 hours minus the occupation period. Switches 68 and 69 are closed, switch 70 is opened and knob 42 rotated to bring damper 38 to the dotted line position, thus closing the circuits of motors 38 and 47 so as to set compressor 45 and fan 33 in operation. With dampers 39, 40 and 41 so positioned, air will pass from duct 35 into the lower compartment of unit 10 and from thence through hole 49 into duct 26 and the atmosphere. This current of air will carry away the heat generated during the compression of the refrigerant. The refrigerant after being compressed by compressor 45 passes to condenser 53 wherein it is cooled and condensed. The cooled, compressed refrigerant is then expanded and circulated through coil 55 to remove the heat from the water in tank 29 and eventually turn it to ice. As this goes on the volume of the water will increase, thus raising float 58 with the result that when the water reaches the predetermined level, float 58 will cause switch 59 to open thereby shutting down compressor 45.

Assuming now that a daily conditioning period of maximum weather is about to commence. Knob 42 is rotated to carry damper 39 to the full line position thereby causing mercury switch 63 to open the circuit of motor 47, damper 40 to open the outlets of conduits 31 and damper 41 to move to its open position. Fan 33 will now pass the air through conduits 31. The air in passing through conduits 31 will transfer heat to the ice in tank 29, and if the moisture content of the air is excessive condensation will take place on the walls of conduits 31, thus taking care of the moisture load. As soon as enough of the ice has melted to allow mercury switch 59 to move to the close circuit position, 15 minutes of conditioning will usually be sufficient, switch 69 is opened and the conditioning of the air will from thence on be controlled by thermostat 15. The flow of conditioning air through unit 10 is at all times sufficient to cause a thorough intermixing of all the air in enclosure 12.

During the next charging period unit 10 will function as heretofore described, but in addition disc 52 will spray the water collected due to the dehumidification of the conditioning air, against condenser 53. In this manner the water collected is disposed of and the refrigerant cooled to a lower temperature than would be possible with air alone.

When it is desired to charge the unit during the full twenty-four hours, the mercury switch 70 is closed so that the motor 47 will be solely under control of the mercury switch 59. Charging and conditioning may now take place simultaneously by rotating the knob 42 to move the damper 39 to the full line position and to move the dampers 40 and 41 to open position. The air from the enclosure circulated by the fan 33 passes through the conduits 31 to be cooled and dehumidified and is discharged into the enclosure. The fan blades 48 now circulate outside air over the condenser, the air entering through the duct 25 and passing through the opening 54 into the lower compartment of the unit 10, thence through the opening 49, in contact with the condenser 53, after which the air passes through the duct 26 to the outside. As before, if the switch 59 is open, the switch 69 is closed for about 15 minutes to permit enough ice to melt to allow the mercury switch 59 to move to the closed circuit position. The switch 69 is then opened, after which the thermostat 15 controls the fan 33 and, thereby, the delivery of cooled air into the enclosure 12.

To continue to charge the unit using outside air, all that is necessary in order to terminate the conditioning period is to open the switches 68 and 69. Forced circulation of air through the conduits 31 is terminated, while operation of the compressor 45 and the fan blades 48 continues until sufficient water is frozen to open the switch 59. If it is desired to charge the unit using air from the enclosure, it may be done as first described.

A particular advantage of the arrangement described above is that it permits a rapid change of air in the enclosure after a period of conditioning. If the enclosure is occupied by an unusually great number of people during the conditioning period, a rapid change of air may become desirable. With the present unit, this may be readily effected by simply rotating the knob to move the damper 39 to the dotted line position, whereupon the fan 33 and the fan blades 48 may be operated in series to exhaust air from the enclosure to the outside in the manner described above.

In Figure 5 is shown another preferred embodiment of unit 10 of this invention. The unit of Fig. 5 is generally identical with that of Figs. 1–4; however, conduits 31 as well as insulation 30 have been omitted and the conditioning air is caused to pass around the outside of tank 29. This construction is somewhat cheaper and more satisfactory as all possibility of condensation of moisture on the outside of unit 10 is eliminated.

While I have described two preferred embodiments of my invention in detail I do not wish to be limited thereto as it is obvious various modifications are possible within the scope of the appended claims.

I claim:

1. In combination with an enclosure subject to a variable weather load, an air conditioning unit adapted to condition said enclosure during intermittent periods of substantial duration, said unit including means for cooling and dehumidifying air, means for circulating a variable quantity of air from said enclosure into contact with said cooling and dehumidifying means and back to said enclosure, means for circulating air from the atmosphere through said unit and back to the atmosphere, means for imparting the heat and moisture removed from said variable quantity of air to said other circulated air, and means allowing passage of air from said enclosure to said atmospheric air circulating means during the intervals between said intermittent conditioning periods.

2. In an air conditioning unit, a casing, partition means dividing said casing into a front and a rear section, vertical partition means dividing said rear section into a pair of conduits, means extending from the rear of said casing allowing air to enter one of said pair of conduits and allowing air to exit from the other of said pair of conduits, further partition means dividing said front section into compartments, holes in said first partition means allowing passage of air from said air inlet conduit through one of said compartments to said outlet conduit, holes in said casing allowing air to enter another of said compartments and exit from the top thereof, means for passing a variable quantity of air through said another compartment, heat exchange means including a heat absorbing medium storage tank in said another compartment located in the path of the air flowing therethru, refrigeration apparatus including a motor driven compressor, a condenser and a finned expanded refrigerant circulating coil, said condenser being located in said outlet conduit, said compressor being located in said one compartment, and said coil being located in said tank, means for drawing air from said inlet conduit through said one compartment to said outlet conduit, means for collecting the water condensed in said other compartment and leading said water to the bottom of said outlet conduit, and means for spraying said water onto the surface of said condenser.

3. In an air conditioning unit, a casing, partition means dividing said casing into a front and a rear section, vertical partition means dividing said rear section into a pair of conduits, means extending from the rear of said casing allowing air to enter one of said pair of conduits and allowing air to exit from the other of said pair of conduits, further partition means dividing said front section into compartments, holes in said first partition means allowing passage of air from said air inlet conduit through one of said compartments to said outlet conduit, holes in said casing allowing air to enter another of said compartments and exit from the top thereof, means for passing a variable quantity of air through said another compartment, heat exchange means including a heat absorbing medium storage tank in said another compartment located in the path of the air flowing therethru, refrigeration apparatus including a motor driven compressor, a condenser, and a finned expanded refrigerant circulating coil, said condenser being located in said outlet conduit, said compressor being located in said one compartment, and said coil being located in said tank, means for drawing air from said inlet conduit through said one compartment to said outlet conduit; a damper in said inlet conduit, a second damper pivoted to said casing adapted to be positioned to close said holes allowing exit of air from said casing, a hole in said further partition means allowing communication between said compartment, a third damper adapted in one position to close said last mentioned hole and in another position to prevent passage of air to said heat exchange means, and means for positioning said dampers as a unit.

4. In an air conditioning unit adapted to condition air during intermittent periods of substantial duration; a casing; partition means dividing said casing into a front and a rear section; vertical partition means dividing said rear section into a pair of conduits; means extending from the rear of said casing allowing air to enter one of said pair of conduits and allowing air to exit from the other of said pair of conduits; further partition means dividing said front section into compartments; holes in said first partition means allowing passage of air from said air inlet conduit through one of said compartments to said outlet conduit; means for passing air from said inlet conduit to said air outlet conduit; means in said casing allowing air to enter the bottom of the other of said compartments and exit at the top thereof; means for passing a variable quantity of air through said other compartment; heat exchange means including a heat absorbing medium storage tank in said other compartment located in the path of the air flowing therethru; said tank being of a size to hold an amount of heat absorbing medium capable of absorbing the heat required to be absorbed during the conditioning period of maximum weather as said medium undergoes a change of phase and/or state; refrigeration apparatus including a motor driven compressor in said other compartment, a condenser in said air outlet conduit, and a finned expanded refrigerant circulating coil in said tank; and float operated means in said tank operable to shut down said compressor when the phase and/or state of the heat absorbing medium in said tank is re-established.

5. In an air conditioning unit adapted to condition air during intermittent periods of substantial duration; a casing; means dividing said casing into a pair of conduits and a pair of compartments; means extending from said casing allowing air to enter one of said pair of conduits and exit from the other conduit of said pair; means allowing passage of air from said air inlet conduit to one of said compartments of said pair and from said one compartment to said air outlet conduit; means for passing air from said inlet conduit through said one compartment to said outlet conduit; air inlet means at the bottom of the other compartment of said pair of compartments; air outlet means at the top of said other compartment; means for passing a variable volume of air through said other compartment; a heat absorbing medium storage tank in said other compartment positioned between the air inlet means and air outlet means thereof, said tank being of a size to hold an amount of heat absorbing medium capable of absorbing the heat required to be absorbed during the conditioning of maximum weather as said medium undergoes a change of phase and/or state; refrigeration apparatus including a compressor in said one compartment, a condenser in said air outlet conduit, and a finned expanded refrigerant circulating coil in said tank; float actuated means in said tank adapted to shut down said compressor when said medium has a predetermined heat absorbing capacity; and means operable as a unit preventing passage of air around said tank and through said air inlet conduit and allowing passage of air from the bottom of said other compartment to said one compartment and air outlet conduit during the intervals between said intermittent periods.

6. In a self contained air conditioning unit adapted to condition the air in an enclosure, a casing, means for directing a current of air through said casing, means in said casing for cooling and dehumidifying said directed air, means for directing a second current of air through said casing, said second mentioned air directing means including positionable means adapted in one position to allow said second current of air to be drawn from outside of said enclosure and in another position to allow said second current of air to be drawn from said enclosure, and means in said casing for imparting the heat removed from said first current of air to said second current of air at a substantially constant rate.

7. In a device of the kind described, a casing, a heat absorbing medium in said casing, refrigerating apparatus for cooling said heat absorbing medium, a plurality of air passages thru said casing, means for forcing streams of air thru said passages, means in said casing, movable to direct one of said air streams thru said refrigerating apparatus adapted to convey heat from the refrigerating apparatus into said air or to direct said air into heat exchange contact with said heat absorbing medium whereby the air is cooled and dehumidified and means for utilizing the water resulting from the dehumidifying for further extracting heat from the refrigerating apparatus.

8. In a device of the kind described, a casing, a heat absorbing medium in said casing, refrigerating apparatus for cooling said heat absorbing medium, including a condenser for the refrigerant, means for forcing streams of air thru said casing and for bringing one of said air streams into heat exchange relation with said heat absorbing medium, to cool and dehumidify the air, a liquid reservoir adjacent said condenser for receiving water condensed from the air, means for conducting the water condensed from the air to said reservoir, means for agitating said water to cause it to contact with said condenser thereby assisting in condensing the refrigerant therein, means for forcing another of said streams of air thru another portion of the casing and into contact with said condenser to cool the same, and means in the casing movable to cut off either of the said streams of air and permit circulation of the other.

9. A self contained unit for conditioning air in an enclosure comprising a casing, partition means in said casing separating said casing into two compartments, means for moving streams of air thru said casing, a damper in said partition movable to open one of said compartments to the passage of air therethru and to close the other to cause the air to travel thru one of said compartments and to prevent its travel thru the other, heat exchange means positioned in heat exchange relation with one compartment for removing heat and moisture from the air passing thru the compartment, and means in the other compartment for imparting some of the heat extracted from the air passing thru the first compartment to the air passing thru the second compartment.

10. A self-contained unit for conditioning air in a room, said unit comprising a casing, an evaporator in the casing, means for circulating air from the room in heat transfer relation to the evaporator and for discharging the same into the room, a compressor and a condenser in said casing arranged in refrigerant-flow relation to said evaporator, said unit having a passage discharging to the outside of said room, means for admitting air from the room to said passage and from the outside of the room to said passage, damper means for controlling the flow of air to said passage so that in one position of the damper means the air admitted to said passage is primarily air from the outside of the room and so that in a second position the air admitted to said passage is substantially entirely air from said room, and air translating means for effecting flow of air through said passage, the air from outside the room flowing in heat-transfer relation to said condenser.

11. An air conditioning unit as set forth in claim 10 wherein the air admitted to the passage from the room also flows in heat-transfer relation to said condenser.

KEMPER PENN BRACE.